United States Patent
Yoo et al.

(10) Patent No.: US 8,655,539 B2
(45) Date of Patent: Feb. 18, 2014

(54) CONTROL METHOD OF PERFORMING ROTATIONAL TRAVELING OF ROBOT CLEANER

(75) Inventors: Kyung Hwan Yoo, Incheon-si (KR); Dong Won Kim, Hwaseong-si (KR); Jae Man Joo, Suwon-si (KR); Jun Hwa Lee, Suwon-si (KR); Jun Pyo Hong, Suwon-si (KR); Woo Ram Chung, Seoul (KR); Jae Young Jung, Suwon-si (KR); Hwi Chan Jang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 262 days.

(21) Appl. No.: 12/926,432

(22) Filed: Nov. 17, 2010

(65) Prior Publication Data

US 2011/0118928 A1 May 19, 2011

(30) Foreign Application Priority Data

Nov. 18, 2009 (KR) ........................ 10-2009-0111628

(51) Int. Cl.
*G05D 1/02* (2006.01)
(52) U.S. Cl.
USPC ............ 701/26; 700/245; 700/253; 700/258; 318/568.12; 299/1.05

(58) Field of Classification Search
USPC ................ 701/26, 2; 700/245, 250, 258, 253; 15/4, 52.1; 318/568.12; 299/1.05
See application file for complete search history.

(56) References Cited

U.S. PATENT DOCUMENTS

| | | | |
|---|---|---|---|
| 7,188,000 B2 * | 3/2007 | Chiappetta et al. | 700/245 |
| 7,286,902 B2 * | 10/2007 | Kim et al. | 700/245 |
| 8,087,117 B2 * | 1/2012 | Kapoor et al. | 15/52.1 |
| 2005/0021179 A1 * | 1/2005 | Kim et al. | 700/245 |
| 2005/0267631 A1 * | 12/2005 | Lee et al. | 700/245 |
| 2006/0076917 A1 * | 4/2006 | Lim et al. | 318/568.12 |
| 2006/0253224 A1 * | 11/2006 | Tani et al. | 700/245 |
| 2009/0055022 A1 * | 2/2009 | Casey et al. | 700/258 |
| 2009/0306822 A1 * | 12/2009 | Augenbraun et al. | 700/245 |
| 2010/0037418 A1 * | 2/2010 | Hussey et al. | 15/319 |
| 2011/0054679 A1 * | 3/2011 | Lefebvre et al. | 700/245 |

* cited by examiner

*Primary Examiner* — Tuan C. To
(74) *Attorney, Agent, or Firm* — Staas & Halsey LLP

(57) ABSTRACT

Disclosed herein is a control method of a robot cleaner in which a robot cleaner is moved at an arbitrary starting angle along a rotation trajectory having an arbitrary rotational center and rotation radius during obstacle-following traveling, whereby an obstacle-following traveling time is reduced and consequently, a movement time of the robot cleaner is reduced.

23 Claims, 13 Drawing Sheets

CONTROL METHOD OF PERFORMING ROTATIONAL TRAVELING OF ROBOT CLEANER

CROSS-REFERENCE TO RELATED APPLICATIONS

This application claims the priority benefit of Korean Patent Application No. 10-2009-0111628, filed on Nov. 18, 2009 in the Korean Intellectual Property Office, the disclosure of which is incorporated herein by reference.

BACKGROUND

1. Field

At least one embodiment relates to a robot cleaner which performs a cleaning operation while traveling about a space to be cleaned, and a control method of the robot cleaner to allow the robot cleaner to more rapidly move to a target zone for cleaning, docking or the like.

2. Description of the Related Art

Generally, a robot cleaner is an apparatus to perform a cleaning operation by suctioning dust, loose debris, etc. from floors while traveling about a space to be cleaned without manual control.

Such a robot cleaner functions to detect a distance from an obstacle, such as furniture, office equipment, and walls, located within a cleaning zone by sensors, thereby cleaning the cleaning zone while traveling so as not to collide with the obstacle based on the detected information.

The robot cleaner travels in a preset traveling pattern, such as, e.g., a zigzag traveling pattern and a random traveling pattern, during cleaning. Also, when it is necessary to move to another zone within the same room, to the next room, or to a charging station or a docking station to recharge batteries or to discharge collected dust, the robot cleaner adopts a wall-following algorithm to allow the robot cleaner to travel along the wall.

During the wall-following traveling, the robot cleaner travels at a low speed along the wall while maintaining a constant distance from the wall, and therefore, it takes the robot cleaner a long time to reach a target zone if the room has a large area. Besides, the robot cleaner may collide with the wall, and such collision may further increase overall cleaning time.

Further, the presence of obstacles gathered toward the wall may further accelerate consumption of battery power, and a limited battery capacity may reduce a probability of the robot cleaner successfully reaching a target location.

SUMMARY

Therefore, it is an aspect of at least one embodiment to provide a control method of a robot cleaner, in which a robot cleaner moves along a rotation trajectory to reduce an obstacle-following traveling time thereof.

Additional aspects will be set forth in part in the description which follows and, in part, will be obvious from the description, or may be learned by practice of the invention.

The foregoing and/or other aspects are achieved by providing a control method of a robot cleaner, includes determining whether or not to perform obstacle-following traveling of the robot cleaner, and performing rotational traveling of the robot cleaner based on an arbitrary starting angle of the robot cleaner along a rotation trajectory having an arbitrary rotation radius about an arbitrary rotation center it is determined to perform the obstacle-following traveling.

The control method may further include: sensing whether an obstacle is present by a sensor, wherein the rotational traveling includes moving the robot cleaner away from the obstacle sensed by the robot cleaner, and thereafter moving the robot cleaner toward the obstacle, when it is sensed that an obstacle is present.

A travel speed of the robot cleaner may be increased while the robot cleaner is moved away from the obstacle, and may be decreased while the robot cleaner is moved toward the obstacle.

The rotational traveling may be repeated at a constant period with respect to the obstacle.

The rotation radius of the rotational traveling may be increased to allow the robot cleaner to meet the obstacle after the obstacle has been sensed even when no obstacle is subsequently sensed during obstacle-following traveling A speed of the rotational traveling may be equal to an actual cleaning travel speed of the robot cleaner.

A speed of the rotational traveling in which the robot cleaner travels while not maintaining a constant distance from the obstacle may be faster than a speed of obstacle-following traveling in which the robot cleaner travels while maintaining a constant distance from the obstacle.

The control method of the robot cleaner may further include accumulating a rotation angle of the robot cleaner in an opposite direction of a predetermined rotation direction thereof during the rotational traveling by summing rotation angles of the robot cleaner in the opposite direction of the rotation direction, and changing the starting angle of the robot cleaner to a new angle if the accumulated angle is a preset angle or more, to perform the obstacle-following traveling.

The control method of the robot cleaner may further include accumulating a rotation angle of the robot cleaner in an opposite direction of a predetermined rotation direction thereof during the rotational traveling by summing rotation angles of the robot cleaner in the opposite direction of the rotation direction, and maintaining a constant distance between the robot cleaner and the obstacle if the accumulated angle is a preset angle or more, to perform obstacle-following traveling.

The control method of the robot cleaner may further include determining whether or not to perform a first obstacle-following traveling mode in which the robot cleaner performs rotational traveling with respect to an obstacle, and performing rotational traveling of the robot cleaner at a speed faster than a travel speed of a second obstacle-following traveling mode in which the robot cleaner travels while maintaining a constant distance from the obstacle when implementation of the first obstacle-following traveling mode is determined.

The control method of the robot cleaner may further include determining whether or not to perform the obstacle-following traveling, sensing whether or not an obstacle is present if implementation of the obstacle-following traveling is determined, and moving the robot cleaner away from the obstacle when the obstacle is sensed, and then, continuously moving the robot cleaner away from the obstacle for a predetermined period of time even if when the obstacle is subsequently not longer sensed, and thereafter, moving the robot cleaner toward the obstacle.

The foregoing and/or other aspects are achieved by providing a control method of a robot cleaner upon obstacle-following traveling, includes selecting a starting angle of the robot cleaner, and moving the robot cleaner at the selected starting angle such that a rotation radius of a movement trajectory of the robot cleaner increases as a rotation angle of the robot cleaner increases.

The selection of the starting angle of the robot cleaner may include determining whether or not to perform the obstacle-following traveling, sensing whether or not an obstacle is present it is determined to perform the obstacle-following traveling, and selecting an angle obtained by adding a preset angle to a current angle of the robot cleaner as the starting angle when the obstacle is sensed, or selecting the current angle of the robot cleaner as the starting angle when the obstacle is not sensed.

In the determination of implementation of the obstacle-following traveling, the implementation of the obstacle-following traveling may be determined based on information input from outside the robot cleaner or by the robot cleaner itself when needed.

If the implementation of the obstacle-following traveling is determined, the robot cleaner may immediately begin the obstacle-following traveling after stopping current traveling thereof, or may begin the obstacle-following traveling after moving closer to a wall.

In the selection of the starting angle of the robot cleaner, the preset angle may be in a range of about 20 degrees to about 45 degrees.

The movement of the robot cleaner may include calculating a movement trajectory of the robot cleaner based on the starting angle of the robot cleaner, and moving the robot cleaner along the calculated movement trajectory.

In the calculation of the movement trajectory, the movement trajectory of the robot cleaner may be calculated based on the starting angle and a rotation radius which is preset to correspond to each rotation angle of the robot cleaner on the basis of the starting angle.

In the calculation of the movement trajectory, the preset rotation radius may be less than a width of an exit of a zone in which the robot cleaner is present.

The foregoing and/or other aspects are achieved by providing a control method of a robot cleaner, including: sensing whether or not an obstacle is present; selecting a starting angle of the robot cleaner based on the sensed result of the obstacle, a current angle of the robot cleaner being selected as the starting angle when the obstacle is sensed, a preset angle based on the current angle of the robot cleaner being selected as the starting angle when no obstacle is sensed; rotating the robot cleaner to the preset angle when no obstacle is sensed and maintaining the robot cleaner at the current angle when the obstacle is sensed; and moving the robot cleaner along a rotation trajectory after the angle rotation or angle maintaining.

The control method further including: continuously sensing an obstacle sensing state or an obstacle non-sensing state; moving the robot cleaner away from the obstacle when the obstacle is sensed; and continually moving the robot cleaner away from the obstacle for a predetermined period of time even when an obstacle sensing state is changed to an obstacle non-sensing state, and then moving the robot cleaner toward the obstacle after the predetermined period of time has elapsed.

BRIEF DESCRIPTION OF THE DRAWINGS

These and/or other aspects will become apparent and more readily appreciated from the following description of the at least one embodiment, taken in conjunction with the accompanying drawings of which.

DETAILED DESCRIPTION

Figure 1:
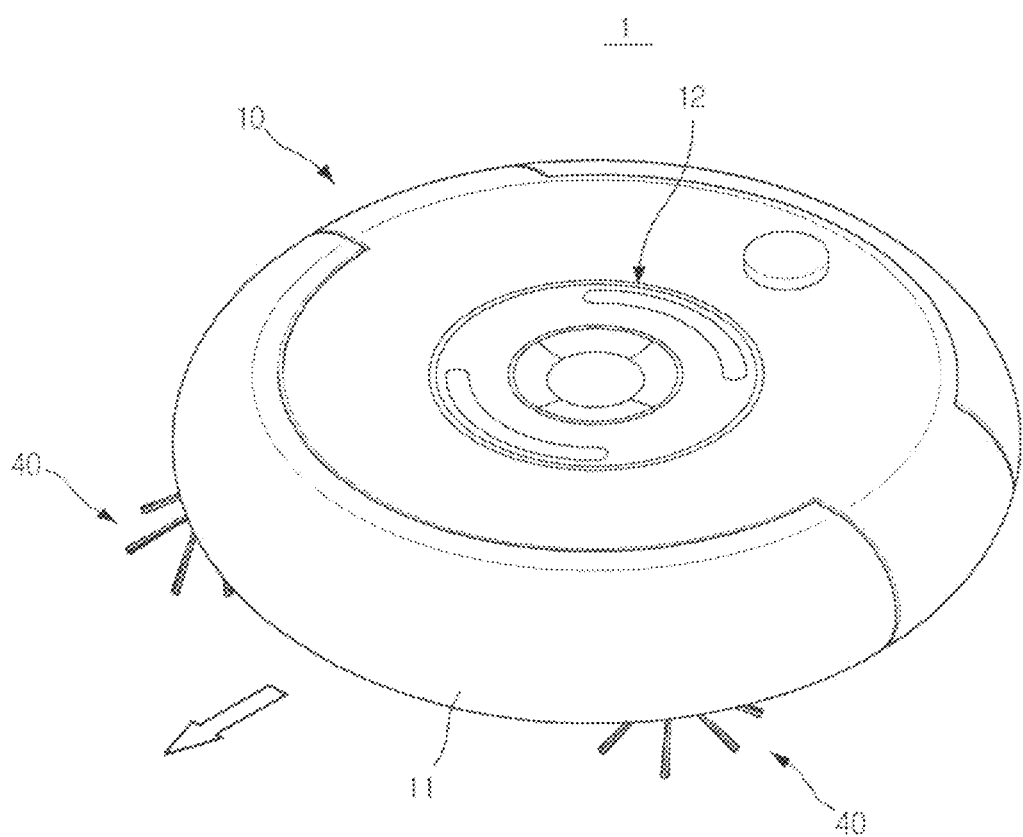
FIG. 1 is a perspective view illustrating an external appearance of a robot cleaner according to at least one embodiment.

Reference will now be made in detail to the at least one embodiment, examples of which are illustrated in the accompanying drawings, wherein like reference numerals refer to like elements throughout.

Figure 2:
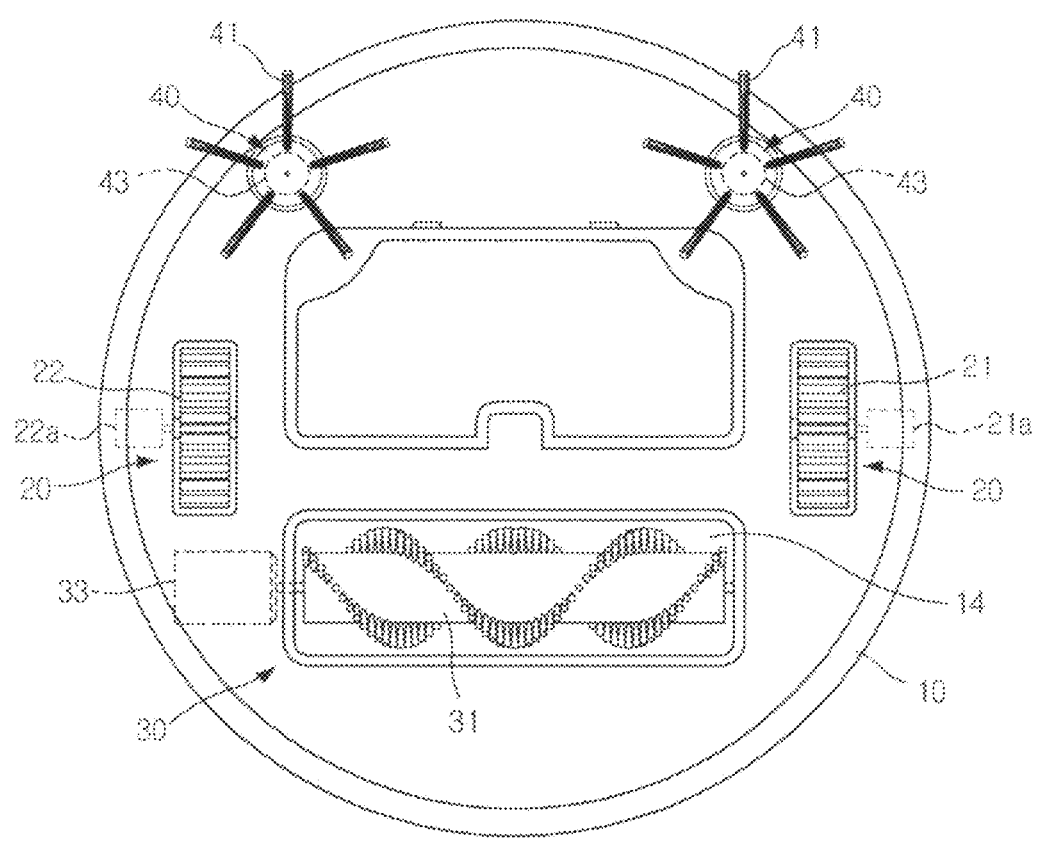
FIG. 2 is a bottom view of the robot cleaner according to the at least one embodiment.

FIG. 1 illustrates an external appearance of a robot cleaner according to at least one embodiment, and FIG. 2 illustrates the bottom of the robot cleaner according to the at least one embodiment.

As illustrated in FIGS. 1 and 2, the robot cleaner 1 according to the at least one embodiment includes a robot body 10 defining an external appearance of the robot cleaner 1, a drive device 20 installed at the bottom of the robot body 10 to move the robot cleaner 10, and brush devices 30 and 40 to sweep up or scatter dust from the floor on which the robot cleaner 1 travels.

In addition to the drive device 20 and the brush devices 30 and 40, the robot body 10 may be provided with, e.g., a contact sensor and a proximity sensor, which may sense an obstacle. For example, a bumper 11 provided at a front end of the robot body 10 may be used to sense an obstacle, such as an object, a wall, etc., and an infrared sensor (or an ultrasonic sensor), for example, provided at the bottom of the robot body 10 may be used to sense an obstacle, such as stairs, etc.

The robot body 10 may be further provided with a display device 12, having a function to inform a user of information about operations and conditions of the robot cleaner 1.

The drive device 20 includes a pair of drive wheels 21 and 22 provided at central opposite side positions, for example, of the robot body 10 to control movement of the robot cleaner 1, a drive motor 21a to rotate the left drive wheel 21, and a drive motor 22a to rotate the right drive wheel 22. Both the drive wheels 21 and 22 are driven forward or rearward by the drive motors 21a and 22a according to a command from a control unit that will be described hereinafter, so as to control movement of the robot cleaner 1. In one example, both the drive wheels 21 and 22 may be driven forward or rearward so as to move the robot cleaner 1 forward or rearward. In another example, the right drive wheel 22 may be driven forward while the left drive wheel 21 is driven rearward, so as to turn the robot cleaner 1 to the left, or the left and right drive wheels 21 and 22 may be driven in the opposite directions so as to turn the robot cleaner 1 to the right. While two drive wheels 21 and 22 are shown, the present embodiment is not limited thereto and any of a number of drive wheels may be provided which serve to control movement of the robot cleaner 1.

The brush devices 30 and 40 include a main brush device 30 to sweep up or scatter dust from the floor, the main brush device 30 being located close to a suction port 14 formed in the bottom of the robot body 10 to improve dust suction efficiency, and side brush devices 40 located at front opposite side positions of the bottom of the body 10 to sweep dust from the floor on which the robot cleaner 1 travels toward the suction port 14.

The main brush device 30 includes a drum-shaped main brush 31 having a length corresponding to the suction port 14 and horizontally disposed close to the suction port 14, the main brush 31 being rotated in a roller manner to sweep up dust from the floor, and a main brush motor 33 to rotate the main brush 31.

The side brush devices 40 are installed at front opposite side positions, for example, of the robot body 10 with a predetermined distance therebetween, and each includes a side brush 41 to rotate horizontally on the floor so as to sweep dust from the floor toward the suction port 14, and a side brush motor 43 to rotate the side brush 41.

The robot cleaner 1 according to the at least embodiment includes a dust collecting device to suction and store impurities, such as dust, etc.

Figure 3:
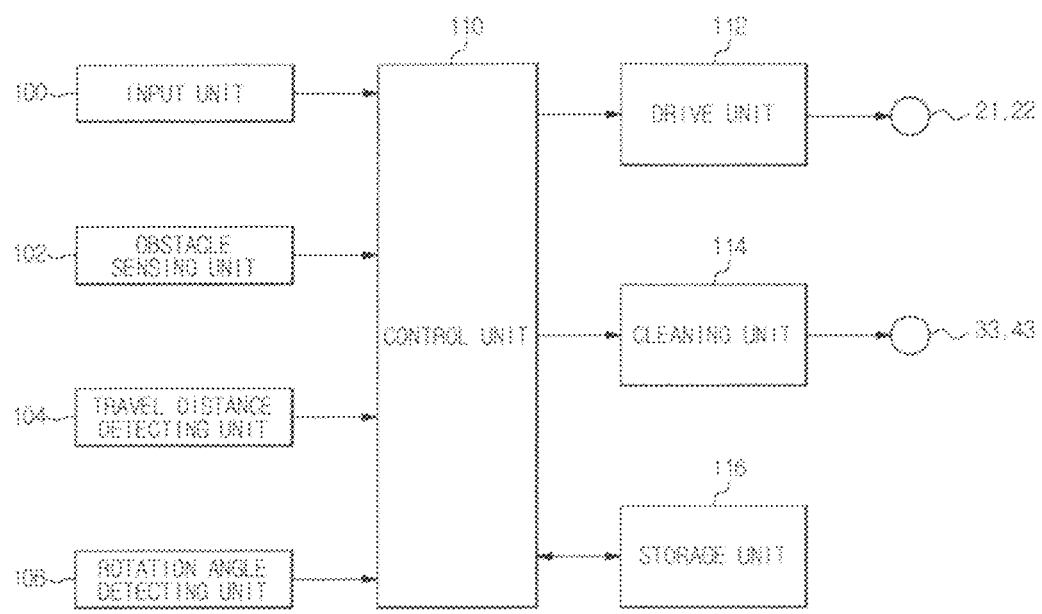
FIG. 3 is a control block diagram of the robot cleaner according to the at least one embodiment.

FIG. 3 is a control block diagram of the robot cleaner according to the at least one embodiment.

As illustrated in FIG. 3, the robot cleaner according to the at least one embodiment includes an input unit 100, an obstacle sensing unit 102, a travel distance detecting unit 104, a rotation angle detecting angle 106, a control unit 110, a drive unit 112, a cleaning unit 114, and a storage unit 116.

The input unit 100 includes a plurality of buttons provided on an upper surface of the robot body 10 or on a remote controller (not shown) to receive a traveling or cleaning command from a user. However, the input unit 100 is not limited thereto and any of a variety of input mechanisms may be provided at the input unit 100.

The obstacle sensing unit 102 serves to sense an obstacle, such as furniture, office equipment, walls, etc., present in a zone in which the robot body 10 travels. The obstacle sensing unit 102 may be an ultrasonic sensor, for example, which senses the presence of an obstacle and a distance from the obstacle by sending ultrasonic waves to a travel path of the robot cleaner 1 and receiving the ultrasonic waves reflected from the obstacle. Also, the obstacle sensing unit 102 may be an infrared sensor, which consists of a plurality of infrared light-emitting elements and light-receiving elements to emit infrared light and receive reflected light.

The travel distance detecting unit 104 detects a travel distance of the robot body 1. The travel distance detecting unit 104 detects information about the travel distance of the robot cleaner 1 by measuring revolutions per minute of the drive wheels 21 and 22 installed for movement of the robot cleaner 10 by e.g., encoders.

The rotation angle detecting unit 106 detects a rotation angle of the robot body 1. To this end, the rotation angle detecting unit 104 includes a rotation angle sensor, such as a gyroscopic sensor, for example, or encoders attached to both the drive wheels 21 and 22.

The control unit 110 controls the operation of the robot cleaner 1.

The drive unit 112 drives the drive wheels 21 and 22 installed at the bottom of the robot body 10 based on command information input from the control unit 110 and obstacle information transmitted from the obstacle sensing unit 102, to allow the robot cleaner 1 to perform rotation, i.e. turnabout, while traveling in a cleaning zone without collision with an obstacle.

The cleaning unit 114 drives the main and side brush motors 33 and 43 based on drive commands input from the control unit 110, to allow the robot cleaner 1 to perform a cleaning operation by suctioning impurities, such as dust, etc., from the floor of the cleaning zone.

The storage unit 116 stores, e.g., preset travel patterns and travel paths according to cleaning commands of the robot cleaner 1 and obstacle information sensed during traveling of the robot cleaner 1.

The control unit 110 may selectively use two wall-following traveling modes while the robot cleaner 1 travels along the wall.

In a first wall-following traveling mode, the robot body 10 approximately rectilinearly moves along the wall while maintaining a constant distance between the robot body 10 and an obstacle.

In a second wall-following traveling mode corresponding to the present at least one embodiment, the robot body 10 moves along a rotation trajectory whenever an obstacle is sensed in such a manner that the robot body 10 is repeatedly moved away from and toward the obstacle. That is, the rotation trajectory movement includes moving the robot body 10 away from an obstacle and thereafter, moving the robot body 10 toward the obstacle. The rotation trajectory movement includes helical movement, semicircular movement, parabolic movement, etc. Here, the obstacle includes the wall and others that hinder traveling.

Selection of the first wall-following traveling mode and the second wall-following traveling mode may be input by the user, or may be previously set.

Differently from in the first wall-following traveling mode, in the second wall-following traveling mode in which the robot body 10 is moved away from the robot body 10 when an obstacle is sensed, the control unit 110 continuously moves the robot body 10 away from the obstacle even if the obstacle is no longer sensed, and only after a predetermined time has elapsed, moves the robot body 10 toward the obstacle. That is, the control unit 100 does not immediately move the robot body 10 toward the obstacle upon transitioning from an obstacle sensing state to an obstacle non-sensing state, but moves the robot body 10 toward the obstacle only after moving the robot body 10 away from the obstacle for a predetermined interval.

Also, in the second wall-following traveling mode, the control unit 110 may adjust a travel speed of the robot body 10. Although an average travel speed of the robot body 10 during the second wall-following traveling mode is controlled to be equal to an average travel speed of the robot body 10 during the first wall-following traveling mode, the average travel speed in the second wall-following traveling mode may be faster than the average travel speed in the first wall-following traveling mode.

In the case of wall-following traveling for, e.g., movement between rooms, movement within a room, and movement to a charging station or a docking station, the control unit 110 selects the second wall-following traveling mode to move the robot body 10 along a rotation trajectory at a higher speed than that in the first wall-following traveling mode in which the robot body 10 maintains a constant distance from an obstacle, such as the wall.

If an obstacle is sensed while the control unit 110 performs the second wall-following traveling mode to move the robot body 10 along a rotation trajectory, the control unit 110 initializes the previous rotation trajectory movement to move the robot body 10 along a new rotation trajectory. Specifically, the control unit 110 moves the robot body 10 forward along a rotation trajectory during wall-following traveling until an obstacle is sensed, and changes the rotation trajectory of the robot body 10 whenever an obstacle is newly sensed during the wall-following traveling of the robot body 10.

If the second wall-following traveling mode begins, the control unit 110 determines whether or not an obstacle is sensed, and selects a starting angle of the robot body 10 based on the sensed result of the obstacle. Then, the control unit 110 moves the robot body 10 along a rotation trajectory after rotating the robot body 10 to the selected starting angle. For example, if no obstacle is sensed in the second wall-following traveling mode, the control unit 110 selects a current angle of the robot body 10 as a starting angle. However, if an obstacle is sensed, the control unit 110 selects a preset angle on the basis of the current angle of the robot body 10 as a starting angle. This is because, if an obstacle is not sensed, the robot body 10 is already distant from the obstacle and has no need to adjust the starting angle thereof, whereas, if an obstacle is sensed, the starting angle of the robot body 10 needs to be adjusted so as to move the robot body 10 away from the obstacle. In this case, the preset angle is less than 90 degrees, and in particular, is in a range of 20 to 45 degrees. The starting angle is an angle at a time when the robot body 10 starts to move along a rotation trajectory.

In one example, the control unit 110 may helically move the robot body 10 such that a rotation radius of a movement trajectory of the robot body 10 increases as a rotation angle of the robot body 10 increases in the second wall-following traveling mode. In another example, the control unit 100 may helically move the robot body 10 such that the movement trajectory of the robot body 10 has a constant rotation radius even if the rotation angle of the robot body 10 increases. Various other helical movements of the robot body 10 are possible. For example, the rotation radius of the movement trajectory may first increase and then decrease, or vice versa, as the rotation angle increases. Here, the rotation angle refers to an angle by which the robot body 10 is rotated on the basis of the starting angle. The rotation angle increases as the robot body 10 is rotated farther on the basis of the starting angle thereof. For reference, to eliminate the risk of the robot body 10 failing to exit one room to move to another room, the rotation radius may be less than a width of an exit of the room in which the robot body 10 is present.

If the robot body 10 moves the same zone one or more time in the second wall-following traveling mode, i.e. the accumulated rotation angle of the robot body 10 in an opposite direction of a predetermined rotation direction is a preset angle (e.g., 720 degrees) or more, the control unit 110 determines that the robot body 10 is present in a narrow zone, exiting from which may prove difficult. In this case, the control unit 110 may switch from the second wall-following traveling mode to the first wall-following traveling mode, thereby allowing the robot body 10 to exit a current zone and move to a target zone. Also, the control unit 110 may increase the starting angle in the second wall-following traveling mode to restart rotation trajectory movement.

The control unit 110 provides the robot body 10 with an arbitrary starting angle and causes the robot body 10 to move along a rotation trajectory having an arbitrary rotation radius about an arbitrary rotational center.

The control unit 110 may receive information about whether or not it is necessary to perform obstacle-following traveling, or may determine implementation of obstacle-following traveling by itself when needed.

If it is determined that obstacle-following traveling is necessary, the control unit 110 may stop the robot body 10 to immediately begin obstacle-following traveling, or may begin obstacle-following traveling after moving the robot body 10 closer to the wall.

During movement of the robot body 10 along the rotation trajectory, the control unit 10 may maintain a constant rotational center and rotation radius of the rotation trajectory, or may change both the rotational center and rotation radius. Also, the control unit 110 may change only the rotation radius while maintaining the constant rotational center of the rotation trajectory along which the robot body 10 moves.

Hereinafter, operational sequence and effects of the robot cleaner having the above described configuration will be described.

Figure 4:
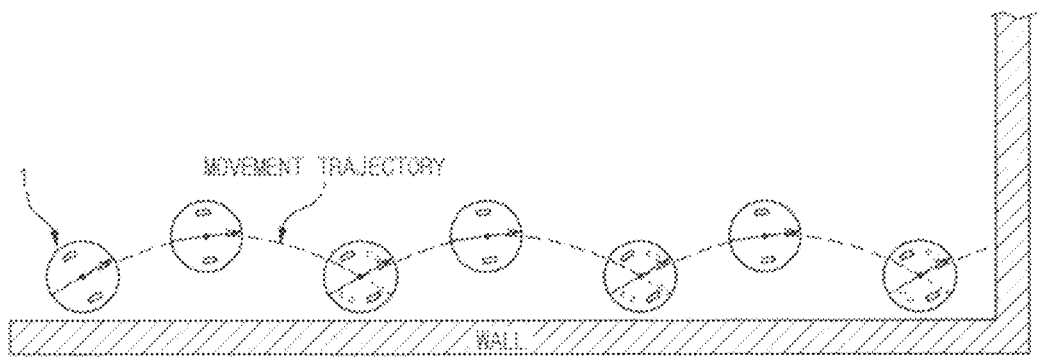
FIG. 4 is a view illustrating a movement trajectory of the robot cleaner according to the at least one embodiment when the robot cleaner performs helical traveling along the wall near to which no object is present.
Figure 5:
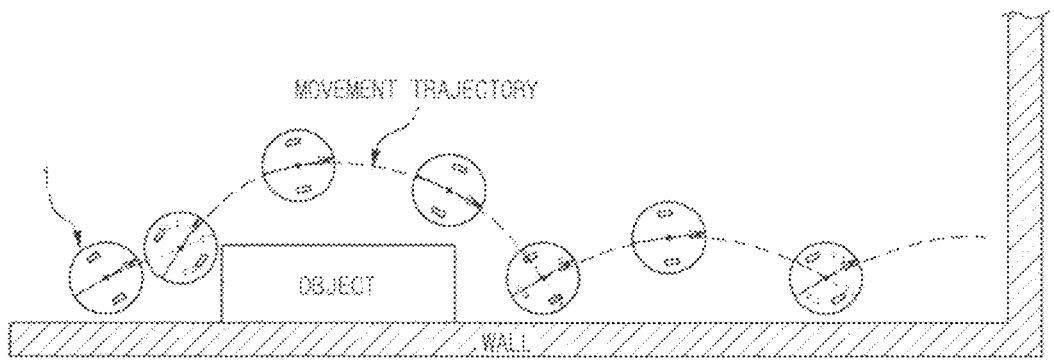
FIG. 5 is a view illustrating a movement trajectory of the robot cleaner according to the at least one embodiment when the robot cleaner performs helical traveling along the wall near to which an object is present.

FIG. 4 illustrates that the robot cleaner according to the at least one embodiment performs helical traveling along the wall near to which no object is present, and FIG. 5 illustrates that the robot cleaner according to the at least one embodiment performs helical traveling along the wall near to which an object is present. Also, FIG. 6 illustrates that the robot cleaner according to the at least one embodiment performs semicircular traveling along the wall near to which no object is present.

As illustrated in FIGS. 4 and 5, the robot cleaner 1 helically moves forward by changing a rotation radius of a movement trajectory thereof as a rotation angle of the robot cleaner 1 increases whenever an obstacle, i.e. the wall is sensed during wall-following traveling. In this case, the robot cleaner 1 begins to helically move along the movement trajectory at a starting angle which is rotated by a predetermined angle with respect to the wall, and stops the previous helical movement whenever the wall is sensed, and then, reinitiates helical movement thereof after being rotated by the starting angle with respect to the sensed wall (see dotted traces of the robot cleaner 1 in FIGS. 4 and 5).

Figure 6:
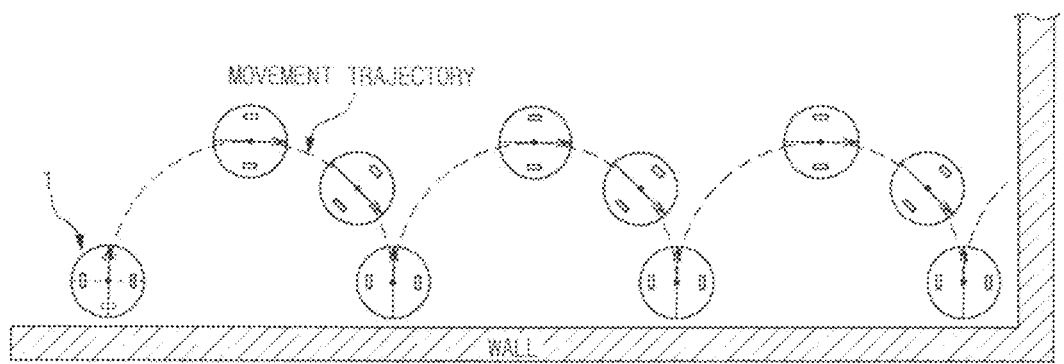
FIG. 6 is a view illustrating a movement trajectory of the robot cleaner according to the at least one embodiment when the robot cleaner performs semicircular traveling along the wall near to which no object is present.

As illustrated in FIG. 6, the robot cleaner 1 moves forward along a semicircular trajectory while maintaining a constant rotation radius of the semicircular movement trajectory even if a rotation angle of the robot cleaner 1 increases whenever an obstacle, i.e. the wall, is sensed during wall-following traveling. In this case, the robot cleaner 1 begins to move along the semicircular trajectory at a starting angle which is rotated by a predetermined angle with respect to the wall, and stops the previous semicircular movement whenever the wall is sensed, and then reinitiates semicircular movement thereof after being rotated by the starting angle with respect to the sensed wall.

Figure 7:
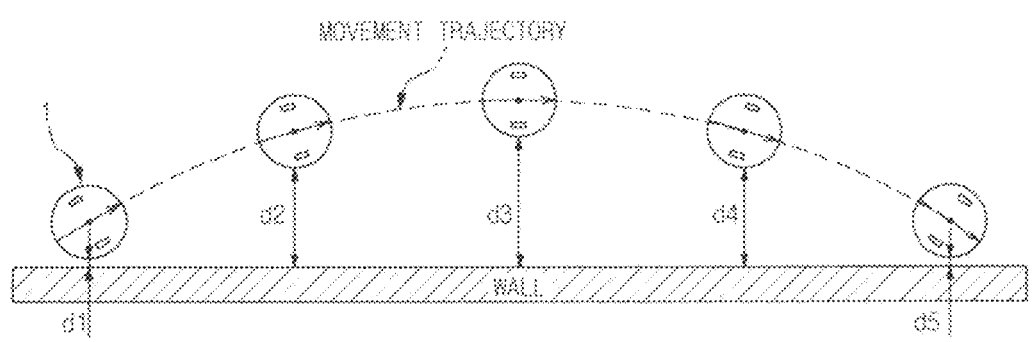
FIG. 7 is a view illustrating a distance from the wall on a per wall position basis while the robot cleaner according to the at least one embodiment helically moves along the wall.
Figure 8:
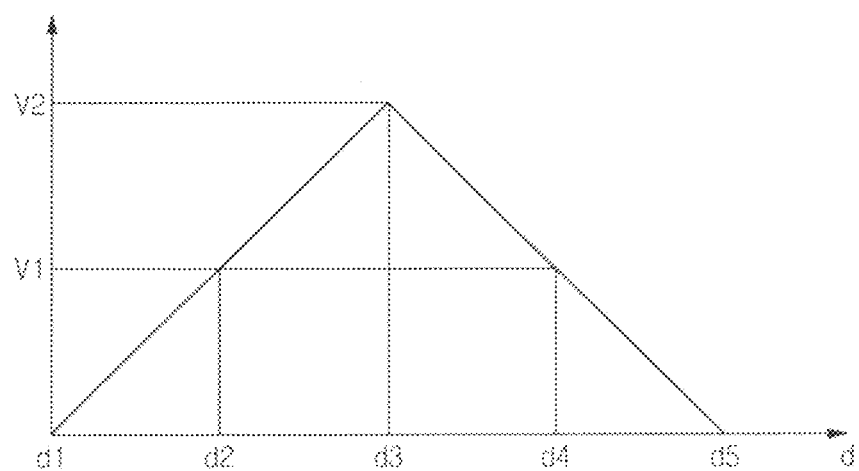
FIG. 8 is a graph illustrating a travel speed of the robot cleaner per the distance illustrated in FIG. 7.

FIG. 7 illustrates a distance from the wall on a per wall position basis while the robot cleaner according to the at least one embodiment helically moves along the wall, and FIG. 8 is a graph illustrating a travel speed of the robot cleaner per the distance illustrated in FIG. 7.

As illustrated in FIGS. 7 and 8, the travel speed V of the robot cleaner 1 increases as the distance d between the robot cleaner 1 and the wall increases from a value d1 to a value d3. On the other hand, the travel speed V of the robot cleaner 1 decreases as the distance d between the robot cleaner 1 and the wall decreases from the value d3 to a value d5.

In this case, although sensing the distance between the robot cleaner 1 and the wall is possible, even without sensing the distance between the robot cleaner 1 and the wall, i.e. regardless of the distance between the robot cleaner 1 and the wall, the travel speed of the robot cleaner 1 may increase with respect to a section of the movement trajectory where the robot cleaner moves away from the wall, and may decrease in a section of the movement trajectory where the robot cleaner moves toward the wall. Also, it may be possible to maintain a constant travel speed of the robot cleaner 1 over each section.

In the meantime, as described above, even if the wall is no longer sensed, the robot body 10 moves away from the wall and thereafter, moves toward the wall. That is, even if the wall sensing state is changed into the wall non-sensing state, the robot body 10 does not immediately move toward the wall, but moves away from the wall along a predetermined section of the movement trajectory, and thereafter moves toward the obstacle.

Also, as described above, the average travel speed of the robot cleaner 1 during the second wall-following traveling mode in which the robot cleaner 1 moves in a rotation trajectory may be faster than the average travel speed of the robot cleaner 1 during the first wall-following traveling mode in which the robot cleaner 1 approximately rectilinearly moves. In the first wall-following traveling mode, the robot cleaner 1 substantially rectilinearly moves while maintaining a constant distance from the wall during, and therefore, it may be necessary for the robot cleaner to travel at a low speed in consideration of collision with the wall. However, in the second wall-following traveling mode, the robot cleaner 1 moves along a rotation trajectory and therefore, may be allowed to travel at a normal speed, thereby achieving a considerable reduction in wall-following traveling time.

The robot cleaner 1 may be moved along a rotation trajectory in such a manner that a rotation radius of the trajectory varies during wall-following traveling. In this case, for example, the robot cleaner 1 may first be moved away from the wall along the first section of the trajectory and thereafter, be moved toward the wall along the second section of the trajectory. To this end, the rotation radius of the movement trajectory of the robot cleaner 1 may be variably set to allow the robot cleaner 1 to move away from the wall along the first section and move toward the wall along the second section.

Figure 9:
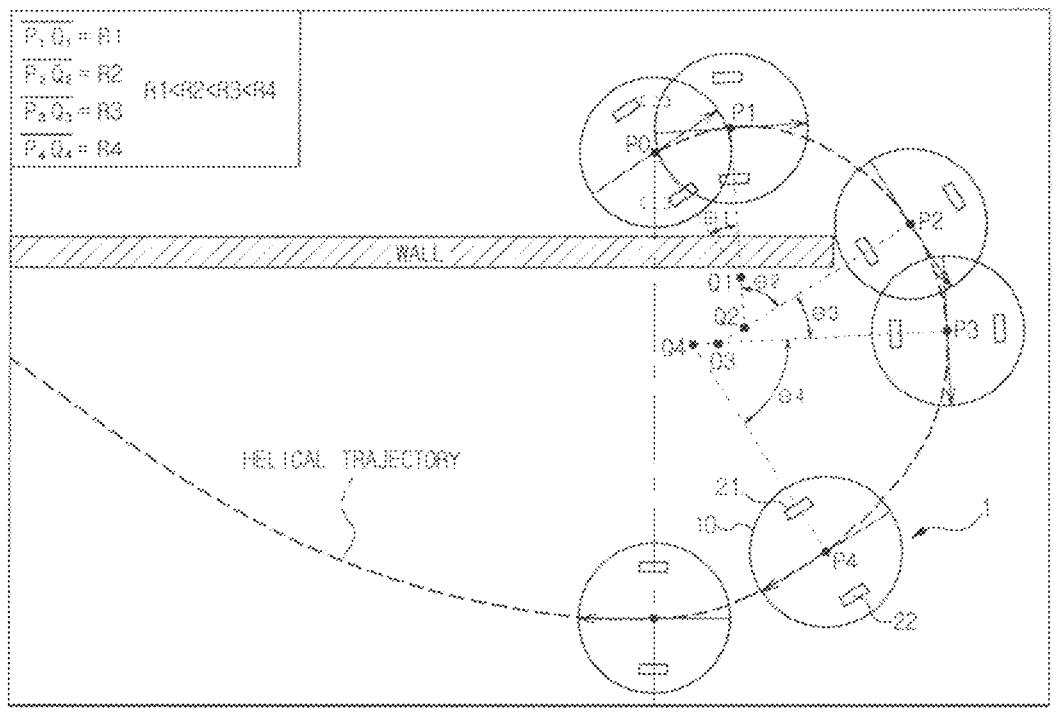
FIG. 9 is a view illustrating movement of the robot cleaner according to at least one embodiment along a helical trajectory, a rotation radius of which gradually increases.
Figure 10:
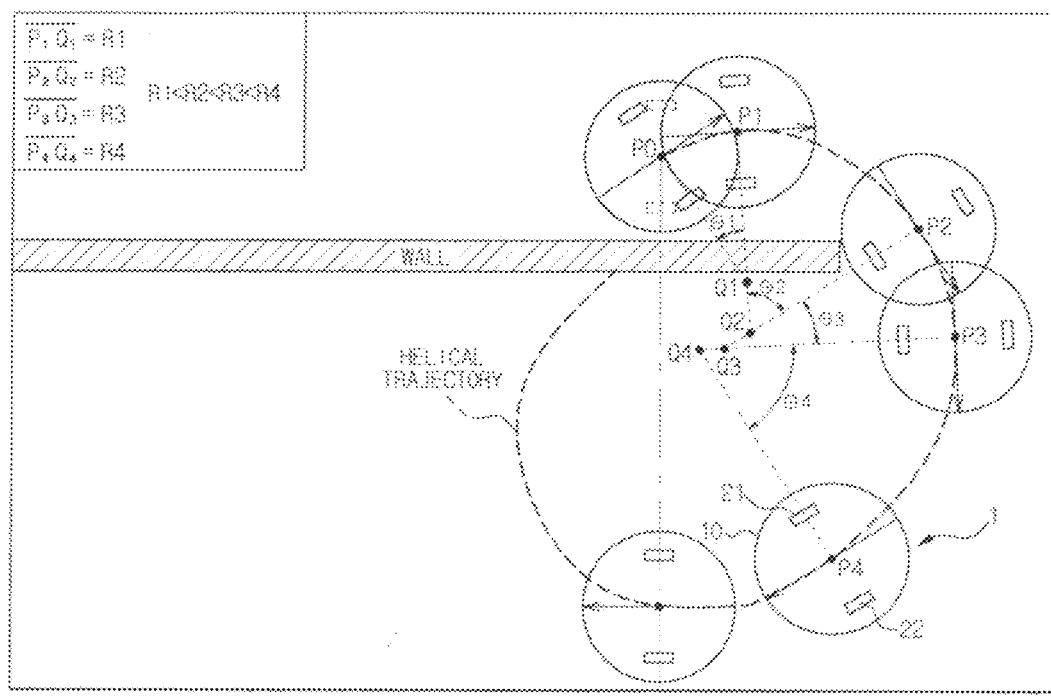
FIG. 10 is a view illustrating movement of the robot cleaner according to the at least one embodiment along a helical trajectory, a rotation radius of which first gradually increases and then gradually decreases.

FIG. 9 illustrates movement of the robot cleaner according to the at least one embodiment along a helical trajectory, a rotation radius of which gradually increases, and FIG. 10 illustrates movement of the robot cleaner according to the at least one embodiment along a helical trajectory, a rotation radius of which first gradually increases, and then gradually decreases.

As illustrated in FIG. 9, the robot cleaner 1 according to the at least one embodiment is rotated by a starting angle in a preset angular direction with respect to the wall upon wall-following traveling. In this case, the starting angle is in a range of 20 to 45 degrees, for example, which is determined to allow the robot cleaner 1 to move away from the wall when beginning helical movement thereof.

The robot cleaner 1, which has rotated by the starting angle with respect to the wall, helically moves while increasing a rotation radius thereof depending on a rotated angle thereof on the basis of the starting angle.

That is, the robot cleaner 1 helically moves such that a center point P0 of the robot cleaner 1 is moved along a helical trajectory.

More specifically, the robot cleaner 1 moves along an arcuate path having a rotation radius R1 on the basis of a rotational center Q1 from a position P0 to a position P1.

Next, the robot cleaner 1 moves along an arcuate path having a rotation radius R2 (R2>R1) on the basis of a rotational center Q2 from the position P1 to a position P2.

Next, the robot cleaner 1 moves along an arcuate path having a rotation radius R3 (R3>R2) on the basis of a rotational center Q3 from the position P2 to a position P3.

Next, the robot cleaner 1 moves along an arcuate path having a rotation radius R4 (R4>R3) on the basis of a rotational center Q4 from the position P3 to a position P4.

Next, the robot cleaner 1 moves along an arcuate path having an increased rotation radius from the position P4 in the same manner as the above description.

As will be appreciated by connecting all the above listed movement paths, the robot cleaner 1 moves along the resultant helical trajectory.

The helical trajectory is determined by a helical trajectory calculation function once the starting angle of the robot cleaner is determined.

A rotation radius of the helical trajectory is set to be gradually increased on a per section basis as the robot cleaner moves. In this case, the rotation radius may be less than a width of an exit (or a width of a door), to facilitate easy passage of the robot cleaner through the door for movement between rooms.

For example, in consideration of a width of a door (e.g., 800 mm), the first rotation radius R1 may be set to 300 mm in an angular range $\theta_1$ of 0 to 30 degrees, the second rotation radius R2 (R2>R1) may be set to 400 mm in an angular range $\theta_2$ of 30 to 90 degrees, the third rotation radius R3 (R3>R2) may be set to 450 mm in an angular range $\theta_3$ of 90 to 120 degrees, and the fourth rotation radius R4 may be set to 500 mm in an angular range $\theta_4$ of 120 to 180 degrees. Also, the rotation radius may be greater than 500 mm in an angular range of 180 degrees or more to allow the robot cleaner 1 to reach the wall eventually, but is set to be less than the door width of 800 mm.

As illustrated in FIG. 9, the rotation radius of the helical trajectory may increase from the range of $\theta_1$ to the range of $\theta_4$, or may first increase from the range of $\theta_1$ to the range of $\theta_2$, and then be kept constant from the range of $\theta_2$ to the range of $\theta_3$, and then decrease from the range of $\theta_4$.

If the robot cleaner 1 is rotated by an angle of −180 degrees on the basis of the starting angle thereof after passing through a room exit via helical movement along the helical trajectory, the rotation radius of the following helical trajectory of the robot cleaner 1 may be gradually increased or decreased according to the purpose of wall-following traveling. Increasing the rotation radius (see the helical trajectory of FIG. 9) may be advantageous when the robot cleaner 1 needs to locate a docking station, and decreasing the rotation radius (see the helical trajectory of FIG. 10) may be advantageous when the robot cleaner needs to rapidly find the wall during traveling. This is because a docking station may be more rapidly located by traveling across a room.

Figure 11:
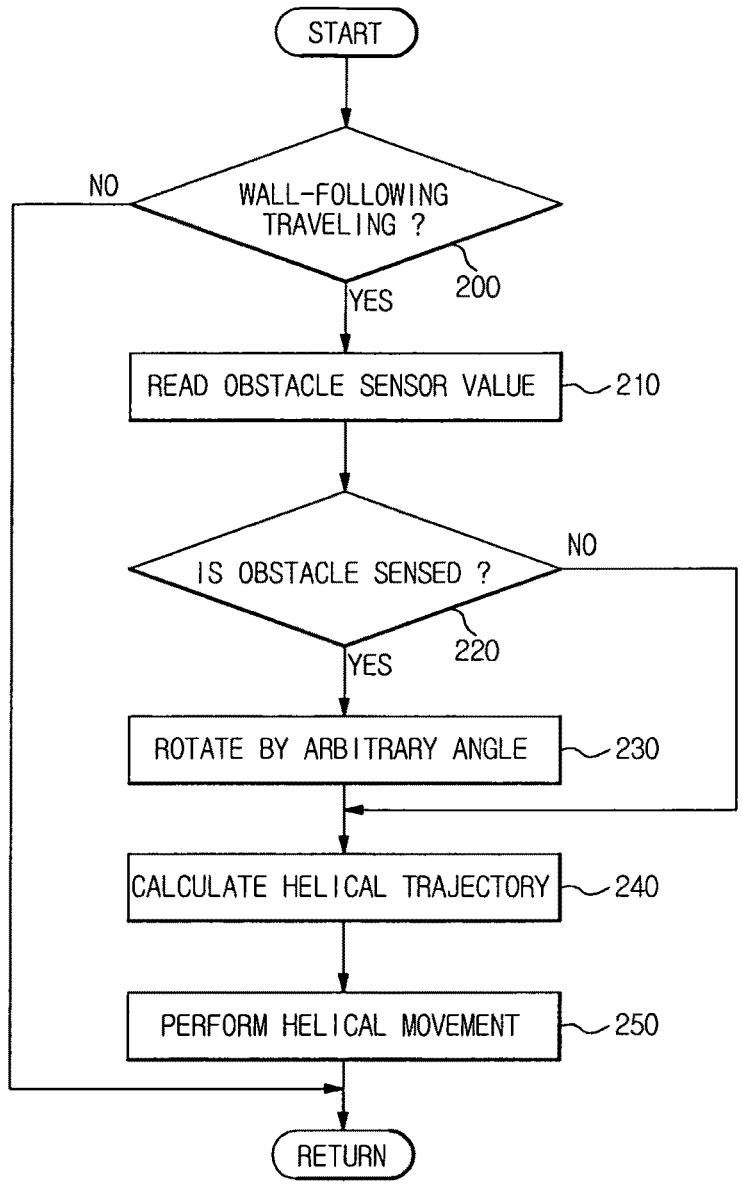
FIG. 11 is a control flow chart illustrating a control method of the robot cleaner according to the at least one embodiment.

FIG. 11 illustrates a control method of the robot cleaner according to the at least one embodiment.

Referring to FIG. 11, the control unit 110 first determines whether or not it is necessary to perform wall-following traveling (200). For example, the control unit 110 may determine implementation of wall-following traveling upon receiving a command input via the input unit 10, or by itself when a cleaning operation is completed, movement to another cleaning zone is necessary, movement to a designated docking station is necessary for battery charging, or movement between rooms is necessary. That is, the control unit 110 may determine implementation of wall-following traveling based on information from the outside or by itself when needed.

If implementation of wall-following traveling is determined based on the result of the operation mode 200, the control unit 110 reads an obstacle sensor signal value output from the obstacle sensing unit 102 (210).

Then, the control unit 110 determines, based on the read obstacle sensor signal value, whether or not an obstacle is sensed (220).

If the obstacle is sensed based on the result of operation 220, the control unit 110 rotates the robot cleaner 1 by an arbitrary angle with respect to the sensed obstacle (230), and calculates a helical trajectory by setting the arbitrary rotation angle of the robot cleaner 1 as a starting angle (240).

On the other hand, if no obstacle is sensed based on the result of operation 220, the control unit 110 calculates a helical trajectory by setting a current angle of the robot cleaner 1 as a starting angle (240).

After calculating the helical movement trajectory, the control unit 110 helically moves the robot cleaner 1 by moving the center point of the robot cleaner 1 along the helical trajectory (250).

Thereafter, whenever an obstacle is sensed, the control unit 110 stops the previous helical movement, and simultaneously performs operations 230 to 250 so as to move the robot cleaner 1 along a new helical trajectory.

Accordingly, the robot cleaner according to the at least one embodiment may reduce a wall-following traveling time, and consequently reduce, e.g., a time for movement between rooms, for movement in a room, and for movement to a charging station or a docking station, and consumption of battery power, thereby achieving a higher probability of successfully moving to a target location.

Figure 12:
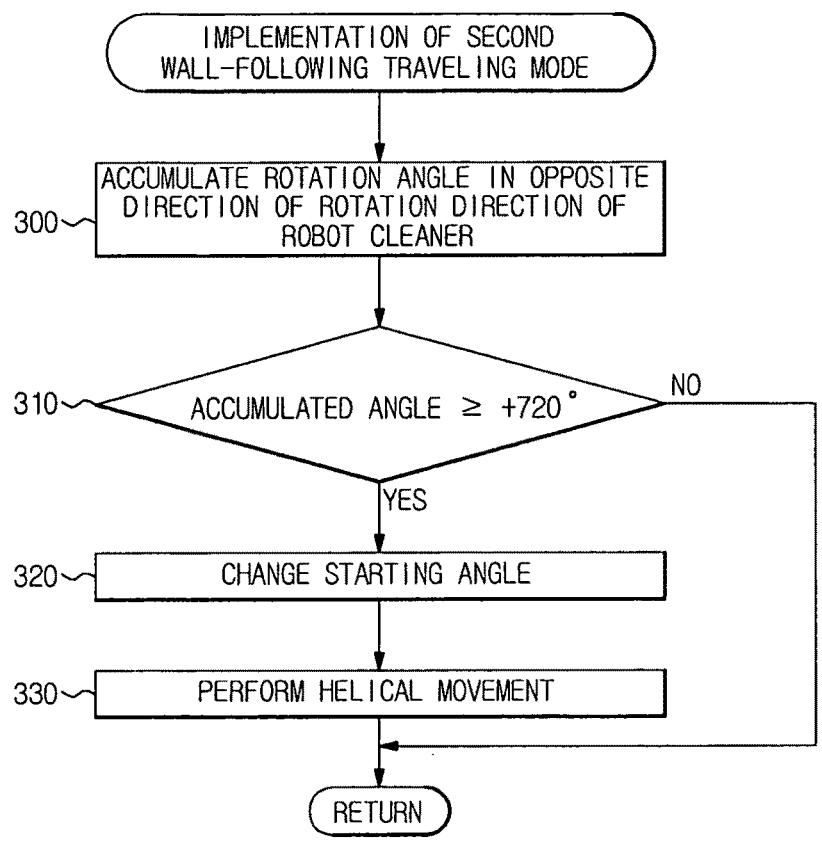
FIG. 12 is a control flow chart illustrating a procedure of allowing the robot cleaner according to the at least one embodiment to escape from a zone having a narrow exit by being helically moved at a new starting angle.

FIG. 12 illustrates a procedure of allowing the robot cleaner according to the at least one embodiment to escape from a zone having a narrow exit by being helically moved at a new starting angle.

Referring to FIG. 12, during implementation of the second wall-following traveling mode, the control unit 110 accumulates a rotation angle of the robot cleaner 1 in an opposite direction of a rotation direction (e.g., a clockwise direction) thereof whenever the robot cleaner 1 is helically moved (300). Specifically, if an obstacle is sensed while the robot cleaner 1 is helically moved, the robot cleaner 1 is rotated in a counterclockwise direction as the control unit 110 rotates the robot cleaner 1 to provide the robot cleaner 1 with a new starting angle. The rotation angle of the robot cleaner 1 in an opposite direction of a rotation direction (e.g., a clockwise direction) thereof is obtained by summing the rotation angles of the robot cleaner 1 in the counterclockwise direction.

After accumulating the rotation angles of the robot cleaner 1 in the opposite direction of the rotation direction thereof, the control unit 110 determines whether or not the accumulated rotation angle is a preset angle (e.g., 720 degrees) or greater (310).

If the accumulated angle is +720 degrees or greater based on the result of operation 310, the control unit 110 determines that the robot cleaner 1 is confined in a zone having a narrow exit, and thus, increases a starting angle of the robot cleaner 1 to allow the robot cleaner 1 to escape from the zone (320).

After increasing the starting angle, the control unit 110 helically moves the robot cleaner 1 at the increased starting angle. This increases a probability of the robot cleaner 1 escaping from the zone having a narrow exit.

Figure 13:
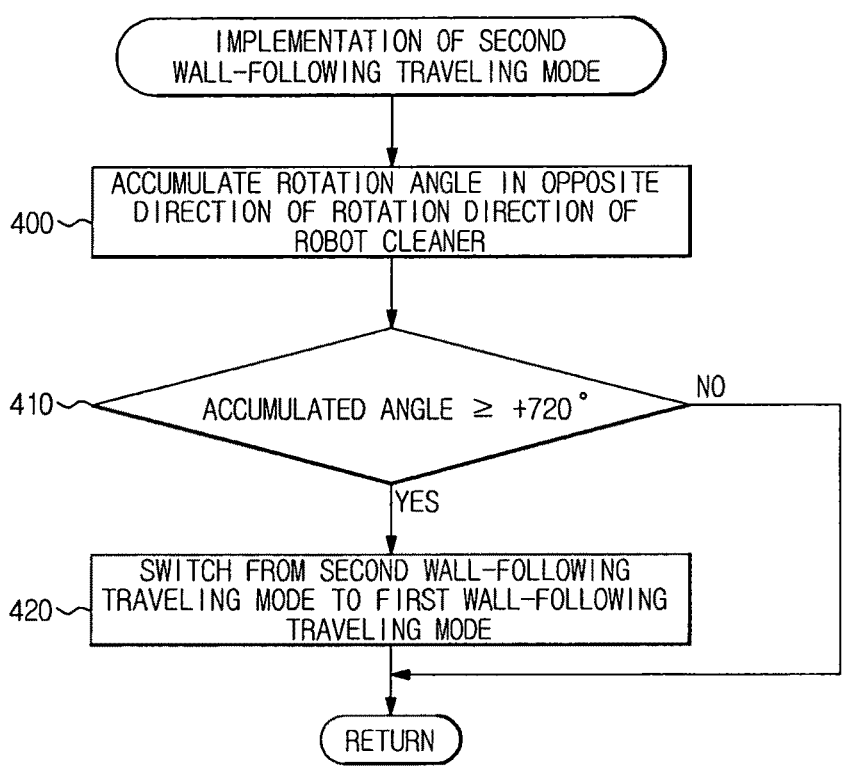
FIG. 13 is a control flow chart illustrating a procedure of allowing the robot cleaner according to the embodiment to escape from a zone having a narrow exit by switching the robot cleaner from a second wall-following traveling mode for helical movement to a first wall-following traveling mode for rectilinear movement.

FIG. 13 illustrates a procedure of allowing the robot cleaner according to the at least one embodiment to escape from a zone having a narrow exit by switching the robot cleaner from a second wall-following traveling mode for helical movement to a first wall-following traveling mode for rectilinear movement.

Referring to FIG. 13, during implementation of the second wall-following traveling mode, the control unit 110 accumulates a rotation angle of the robot cleaner 1 in an opposite direction of a rotation direction (e.g., a clockwise direction) thereof whenever the robot cleaner 1 is helically moved (400). Specifically, if an obstacle is sensed while the robot cleaner 1 is helically moved, the robot cleaner 1 is rotated in a counterclockwise direction as the control unit 110 rotates the robot cleaner 1 to provide the robot cleaner 1 with a new starting angle. The rotation angle of the robot cleaner 1 in the opposite direction of the rotation direction (e.g., a clockwise direction) thereof is obtained by summing the rotation angles of the robot cleaner 1 in the counterclockwise direction.

After accumulating the rotation angles of the robot cleaner 1 in the opposite direction of the rotation direction thereof, the control unit 110 determines whether or not the accumulated rotation angle is a preset angle (e.g., 720 degrees) or greater (410).

If the accumulated angle is +720 degrees or greater based on the result of the operation mode 410, the control unit 110 determines that the robot cleaner 1 is confined in a zone having a narrow exit, and stops the helical movement of the robot cleaner 1 to assist the robot cleaner 1 to escape from the zone. Simultaneously, the control unit 110 converts the current second wall-following traveling mode into the first wall-following traveling mode to allow the robot cleaner 1 to move along the wall while maintaining a constant distance from the wall (420). In this way, the robot cleaner 1 may escape from the zone having a narrow exit.

As is apparent from the above description, according to the at least one embodiment, a robot cleaner is moved at an arbitrary starting angle along a rotation trajectory having an arbitrary rotation center and rotation radius during obstacle-following traveling. This movement may reduce an obstacle-following traveling time of the robot cleaner, thereby reducing a time for movement between rooms, movement in a room, and movement to a charging station or a docking station, and consumption of battery power of the robot cleaner. This may consequently increase a probability of successful movement of the robot cleaner to a target location.

Although at least one embodiment has been shown and described, it would be appreciated by those skilled in the art that changes may be made in the at least one embodiment without departing from the principles and spirit of the invention, the scope of which is defined in the claims and their equivalents.

What is claimed is:

1. A control method of a robot cleaner, comprising:
   determining, by a processor, whether or not to perform obstacle-following traveling of the robot cleaner; and
   performing rotational traveling of the robot cleaner based on an arbitrary starting angle of the robot cleaner along a rotation trajectory having an arbitrary rotation radius about an arbitrary rotational center when it is determined to perform the obstacle-following traveling.

2. The control method according to claim 1, further comprising:

sensing whether an obstacle is present by a sensor, wherein the rotational traveling includes moving the robot cleaner away from the obstacle sensed by the robot cleaner, and thereafter moving the robot cleaner toward the obstacle, when it is sensed that an obstacle is present.

3. The control method according to claim 2, wherein a travel speed of the robot cleaner is increased while the robot cleaner is moved away from the obstacle, and is decreased while the robot cleaner is moved toward the obstacle.

4. The control method according to claim 2, wherein the rotational traveling is repeated at a constant period with respect to the obstacle.

5. The control method according to claim 2, wherein the rotation radius of the rotational traveling is increased to allow the robot cleaner to meet the obstacle after the obstacle has been sensed even when no obstacle is subsequently sensed during obstacle-following traveling.

6. The control method according to claim 2, wherein a speed of the rotational traveling is equal to an actual cleaning travel speed of the robot cleaner.

7. The control method according to claim 2, wherein a speed of the rotational traveling in which the robot cleaner travels while not maintaining a constant distance from the obstacle is faster than a speed of obstacle-following traveling in which the robot cleaner travels while maintaining a constant distance from the obstacle.

8. The control method according to claim 1, further comprising:
  accumulating a rotation angle of the robot cleaner in an opposite direction of a predetermined rotation direction thereof during the rotational traveling by summing rotation angles of the robot cleaner in the opposite direction of the rotation direction; and
  changing the starting angle of the robot cleaner to a new angle when the accumulated angle is a preset angle or greater, to perform the obstacle-following traveling.

9. The control method according to claim 1, further comprising:
  accumulating a rotation angle of the robot cleaner in an opposite direction of a predetermined rotation direction thereof during the rotational traveling by summing rotation angles of the robot cleaner in the opposite direction of the rotation direction; and
  maintaining a constant distance between the robot cleaner and the obstacle when the accumulated angle is a preset angle or greater, to perform obstacle-following traveling.

10. The control method according to claim 1, further comprising:
  determining whether or not to perform a first obstacle-following traveling mode in which the robot cleaner performs rotational traveling with respect to an obstacle; and
  performing rotational traveling of the robot cleaner at a speed faster than a travel speed of a second obstacle-following traveling mode in which the robot cleaner travels while maintaining a constant distance from the obstacle when it is determined to perform the first obstacle-following traveling mode.

11. The control method according to claim 1, further comprising:
  sensing whether or not an obstacle is present when it is determined to perform the obstacle-following traveling; and
  moving the robot cleaner away from the obstacle when the obstacle is sensed, and then continuously moving the robot cleaner away from the obstacle for a predetermined period of time even when the obstacle is subsequently not sensed, and thereafter moving the robot cleaner toward the obstacle.

12. A control method of a robot cleaner selectively performing obstacle-following traveling, comprising:
  selecting, by a processor, a starting angle of the robot cleaner; and
  moving the robot cleaner at the selected starting angle such that a rotation radius of a movement trajectory of the robot cleaner increases as a rotation angle of the robot cleaner increases.

13. The control method according to claim 12, wherein the movement trajectory is one of helical movement, semicircular movement and parabolic movement.

14. The control method according to claim 12, wherein the selection of the starting angle of the robot cleaner includes:
  determining whether or not to perform the obstacle-following traveling;
  sensing whether or not an obstacle is present when it is determined to perform the obstacle-following traveling; and
  selecting an angle obtained by adding a preset angle to a current angle of the robot cleaner as the starting angle when the obstacle is sensed, or selecting the current angle of the robot cleaner as the starting angle when the obstacle is not sensed.

15. The control method according to claim 14, wherein the obstacle-following traveling is determined to be performed based on information input from outside the robot cleaner or by the robot cleaner.

16. The control method according to claim 15, wherein the robot cleaner immediately begins the obstacle-following traveling after stopping current traveling thereof, or begins the obstacle-following traveling after moving closer to a wall when it is determined to perform the obstacle-following traveling.

17. The control method according to claim 14, wherein the preset angle is in a range of about 20 degrees to about 45 degrees.

18. The control method according to claim 12, wherein the movement of the robot cleaner includes:
  calculating the movement trajectory of the robot cleaner based on the starting angle of the robot cleaner; and
  moving the robot cleaner along the calculated movement trajectory.

19. The control method according to claim 18, wherein the movement trajectory of the robot cleaner is calculated based on the starting angle and a rotation radius which is preset to correspond to each rotation angle of the robot cleaner based on the starting angle.

20. The control method according to claim 19, wherein the preset rotation radius is less than a width of an exit of a zone in which the robot cleaner is present.

21. A control method of a robot cleaner, comprising:
  sensing whether or not an obstacle is present;
  selecting, by a processor, a starting angle of the robot cleaner based on the sensed result of the obstacle, a current angle of the robot cleaner being selected as the starting angle when the obstacle is sensed, a preset angle based on the current angle of the robot cleaner being selected as the starting angle when no obstacle is sensed;
  rotating the robot cleaner to the preset angle when no obstacle is sensed and maintaining the robot cleaner at the current angle when the obstacle is sensed; and
  moving the robot cleaner along a rotation trajectory after the angle rotation or angle maintaining.

22. The control method according to claim 21, further comprising:
- continuously sensing an obstacle sensing state or an obstacle non-sensing state;
- moving the robot cleaner away from the obstacle when the obstacle is sensed; and
- continually moving the robot cleaner away from the obstacle for a predetermined period of time even when an obstacle sensing state is changed to an obstacle non-sensing state, and then moving the robot cleaner toward the obstacle after the predetermined period of time has elapsed.

23. A control method of a robot cleaner, comprising:
- determining by a processor whether or not to perform wall-following traveling of the robot cleaner; and
- performing bouncing traveling of the robot cleaner when it is determined to perform the wall-following traveling,
- wherein the performing of the bouncing traveling comprises:
- moving the robot cleaner in a first travelling direction of allowing the robot cleaner to move away from a wall; and
- moving the robot cleaner in a second travelling direction of allowing the robot cleaner to move toward the wall,
- wherein a travelling speed of the robot cleaner is increased during the moving of the robot cleaner in the first travelling direction and the travelling speed of the robot cleaner is decreased during the moving of the robot cleaner in the second travelling direction.

\* \* \* \* \*